(12) United States Patent
Harris

(10) Patent No.: US 7,841,574 B1
(45) Date of Patent: Nov. 30, 2010

(54) ORGANIZER FOR COMPUTER MONITORS

(76) Inventor: Duane J. Harris, 11889 Bob White, No. 834, Houston, TX (US) 77035

( * ) Notice: Subject to any disclaimer, the term of this patent is extended or adjusted under 35 U.S.C. 154(b) by 987 days.

(21) Appl. No.: 11/584,142

(22) Filed: Oct. 19, 2006

Related U.S. Application Data

(60) Provisional application No. 60/728,435, filed on Oct. 19, 2005.

(51) Int. Cl.
*B41J 11/02* (2006.01)
(52) U.S. Cl. ............... 248/444.1; 248/460; 248/451; 248/918
(58) Field of Classification Search ............ 248/442.2, 248/918, 451, 460, 447.1, 441.1, 447.2
See application file for complete search history.

(56) References Cited

U.S. PATENT DOCUMENTS

| | | | | |
|---|---|---|---|---|
| 4,869,565 A | * | 9/1989 | Bachman | 312/234 |
| 5,104,087 A | * | 4/1992 | Wentzloff et al. | 248/442.2 |
| 5,328,145 A | * | 7/1994 | Charapich | 248/442.2 |
| 5,398,905 A | * | 3/1995 | Hinson | 248/442.2 |
| 5,499,793 A | * | 3/1996 | Salansky | 248/442.2 |
| 5,549,267 A | * | 8/1996 | Armbruster et al. | 248/442.2 |
| 5,689,371 A | * | 11/1997 | Butterfield | 359/609 |
| 5,754,259 A | * | 5/1998 | Nakamatsu et al. | 348/835 |
| 5,988,582 A | * | 11/1999 | Olivo | 248/442.2 |
| 6,188,450 B1 | * | 2/2001 | Coons | 348/841 |
| 6,290,200 B1 | * | 9/2001 | Ko | 248/442.2 |
| 6,412,744 B1 | * | 7/2002 | Wollam et al. | 248/442.2 |
| 6,478,282 B1 | * | 11/2002 | Flemming | 248/442.2 |
| D486,831 S | * | 2/2004 | Dayani et al. | D14/448 |
| D522,007 S | * | 5/2006 | Cano | D14/448 |
| 2001/0046115 A1 | * | 11/2001 | Genicevitch | 361/682 |
| 2004/0227048 A1 | * | 11/2004 | Lom et al. | 248/442.2 |

* cited by examiner

*Primary Examiner*—J. Allen Shriver, II
*Assistant Examiner*—Steven M Marsh
(74) *Attorney, Agent, or Firm*—Kenneth A. Roddy

(57) ABSTRACT

An organizer that attaches to a computer monitor or other display monitor and has a transparent dust, glare, and/or UV radiation shield and at least one lateral storage panel with pockets that hold various documents and materials and maintain them in a convenient location for easy access or viewing while working on the computer.

14 Claims, 3 Drawing Sheets

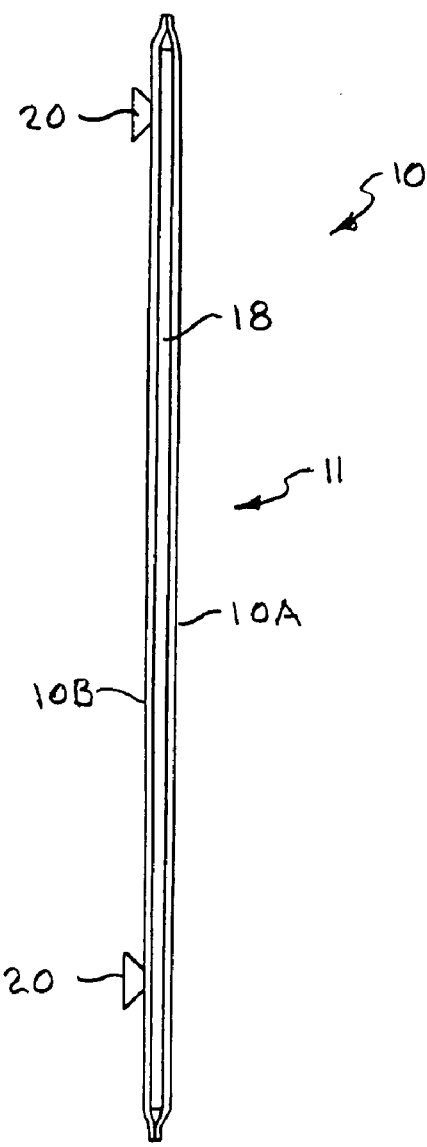
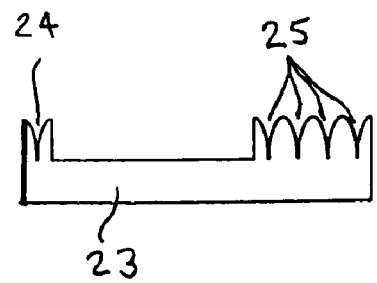
Fig. 4
Fig. 3

ORGANIZER FOR COMPUTER MONITORS

CROSS REFERENCE TO RELATED APPLICATION

This application claims priority of U.S. Provisional Application Ser. No. 60/728,435, filed Oct. 19, 2005.

BACKGROUND OF THE INVENTION

1. Field of the Invention

This invention relates generally to accessories for computer monitors, and more particularly to an organizer that attaches to a computer monitor or other display monitor and which has a transparent dust, glare, and/or UV radiation shield and at least one storage panel with pockets that hold various documents and materials and maintain them in a convenient location for easy access or viewing while working on the computer.

2. Brief Description of the Prior Art

There is a continuing need for an efficient means to securely hold documents such as loose papers, compact disks (CDs), diskettes, business cards, to-do lists, notes, messages, templates, calendars, photographs, and the like in easily removable arrangement at a convenient position for viewing while working at a computer monitor. To that end, various devices have been produced which function to hold such documents, however most are not easily adjustable to the convenience of the user and there appears to be a lack of devices which have further functions including securing documents adjacent to the monitor and providing a transparent dust, glare, and/or UV radiation shield.

Charapich, U.S. Pat. No. 5,328,145 discloses a mounting board for a video display screen housing comprising a planar sheet having an opening for viewing the video display screen in one portion and other portions adjacent the opening for receiving mounts which can retain objects adjacent the planar sheet. An erasable layer can be laminated on the planar sheet to receive markings. The mounting board is attached to the video display screen housing by stabilizers that can be positioned to accommodate for variations in video display screen housings.

Hinson, U.S. Pat. No. 5,398,905 discloses a die-cut display board for a computerized display screen supported in a housing comprising a thin die-cuttable sheet with a front display face, a back face, a periphery and a central region. Top and side housing tabs are die-cut and scored in the central region of the sheet to permit the tabs to be folded inwardly toward the back side as to lie upon the top and the sides of the housing thereby forming a front opening. The sheet is positioned so that the front opening is substantially in flush alignment with the display screen.

Armbruster, et al, U.S. Pat. No. 5,549,267 discloses a frame assembly for use on a computer monitor which includes a stiff frame having generally planar front and rear surfaces and elongate border portions having inner edge surfaces that define an opening through the frame corresponding in shape to the front viewed surface of the monitor. The rear surface of the frame can be attached along the front surface of the housing with the opening in the frame aligned with the front viewed surface, and a layer of repositionable pressure sensitive adhesive adhered to the frame is accessible along the front surface of the frame so that sheets of paper and other objects can be releasably adhered thereto.

Olivo, U.S. Pat. No. 5,988,582 discloses a device for organizing office paraphernalia which uses a PC monitor as a mounting surface. The device is comprised of a shroud mountable to a PC monitor groove located behind the faceplate of the monitor. The shroud is comprised of two adjustable shroud members coupled together by a spring tensioner. The shroud members have an inner edge, an outer edge, and a front face disposed between the inner and outer edges, and a plurality of projections disposed upon the inner edge of the shroud that engage within the monitor groove. A plurality of accessories may be mounted on the outer edges of the shroud members for holding office paraphernalia such as documents, business cards, pens, mirrors, and diskettes. Additionally, the front face serves as a surface for placing "post-it" notes, or other stick-on paraphernalia.

Coons, U.S. Pat. No. 6,188,450 discloses a cover for a computer monitor which permits storage of office materials in side flaps attached to the cover and which provides a support platform for holding documents being examined by the user. The invention also provides a shield piece that can quickly be placed over the monitor screen to block viewing of the matter being displayed on the monitor.

Wollam, et al, U.S. Pat. No. 6,412,744 discloses an adjustable display board for attachment to a monitor housing so that items such as notes, calendars, nameplates, pads, mirrors, writing implements, and keys can be mounted adjacent to a monitor screen. The display board includes a left side frame, a right side frame and a top holder panel that interconnects upper horizontal legs of the left and right side frames and slides along the upper horizontal legs of both the left and right side frames. The top holder panel has retaining edges molded for the purpose of holding various objects such as photographs, messages and other indicia on both of its sides. The left and right side panels provide a surface that functions as a decorative message board and provides a means to attach various other objects temporarily or permanently to it. Additionally, the board surface can be written on and erased similar to a blackboard.

Flemming, U.S. Pat. No. 6,478,282 discloses a device for holding photographs against the front outer surface of a video monitor which includes a substantially transparent plate having a generally planer front side and back side, an elongated portion having a pair of ends, and a pair of legs is coupled to one of the ends of the elongated portion and each extends away in a parallel direction.

The present invention is distinguished over the prior art in general by an organizer that attaches to a computer monitor or other display monitor and which has a transparent dust, glare, and/or UV radiation shield and at least one storage panel with pockets that hold various documents and materials and maintain them in a convenient location for easy access or viewing while working on the computer.

SUMMARY OF THE INVENTION

It is therefore an object of the present invention to provide an organizer that attaches to a computer monitor or other display monitor and which has at least one storage panel with a plurality of pockets that hold various documents and materials and maintain them in a convenient location for easy access or viewing while working on the computer.

It is another object of this invention to provide an organizer that attaches to a computer monitor or other display monitor and which has a transparent dust, glare, and/or UV radiation shield which dissipates damaging static electricity and reduce dust build-up, reduces glare to relieve eye strain and fatigue, and/or protect the user from harmful UV rays, which also includes a plurality of pockets that hold various documents and materials.

Another object of this invention is to provide an organizer that attaches to a computer monitor or other display monitor and has at least one storage panel with a plurality of pockets that hold various loose documents and materials which will reduce desktop clutter and allow items to be organized and maintained at convenient location for easy access or viewing.

Another object of this invention is to provide an organizer that attaches to a computer monitor or other display monitor and which has a transparent dust, glare, and/or UV radiation shield and at least one storage panel on a lateral side thereof that can be pivoted relative thereto and maintained at various angles along side of the monitor housing.

Another object of this invention is to provide an organizer that can be easily and quickly attached to and removed from a computer monitor or other display monitor and which has a transparent dust, glare, and/or UV radiation shield and at least one storage panel with a plurality of pockets that hold various documents and materials and maintain them in a convenient location for easy access or viewing while working on the computer.

A further object of this invention is to provide an organizer that attaches to a computer monitor or other display monitor that allows the placement of a picture and/or logo onto the device for advertising and/or high visibility.

A still further object of this invention is to provide an organizer that attaches to a computer monitor or other display monitor that is attractive in appearance and inexpensive to manufacture.

Other objects of the invention will become apparent from time to time throughout the specification and claims as hereinafter related.

The above noted objects and other objects of the invention are accomplished by an organizer that attaches to a computer monitor or other display monitor and which has a transparent dust, glare, and/or UV radiation shield and at least one storage panel with pockets that hold various documents and materials and maintain them in a convenient location for easy access or viewing while working on the computer.

BRIEF DESCRIPTION OF THE DRAWINGS

FIG. 3 is a cross sectional view of the organizer taken along line 3-3 of FIG. 2.

FIG. 4 is a side elevation view of a latching device for latching the storage panel of the organizer at selected angles relative to the shield panel.

DESCRIPTION OF THE PREFERRED EMBODIMENT

Figure 1:
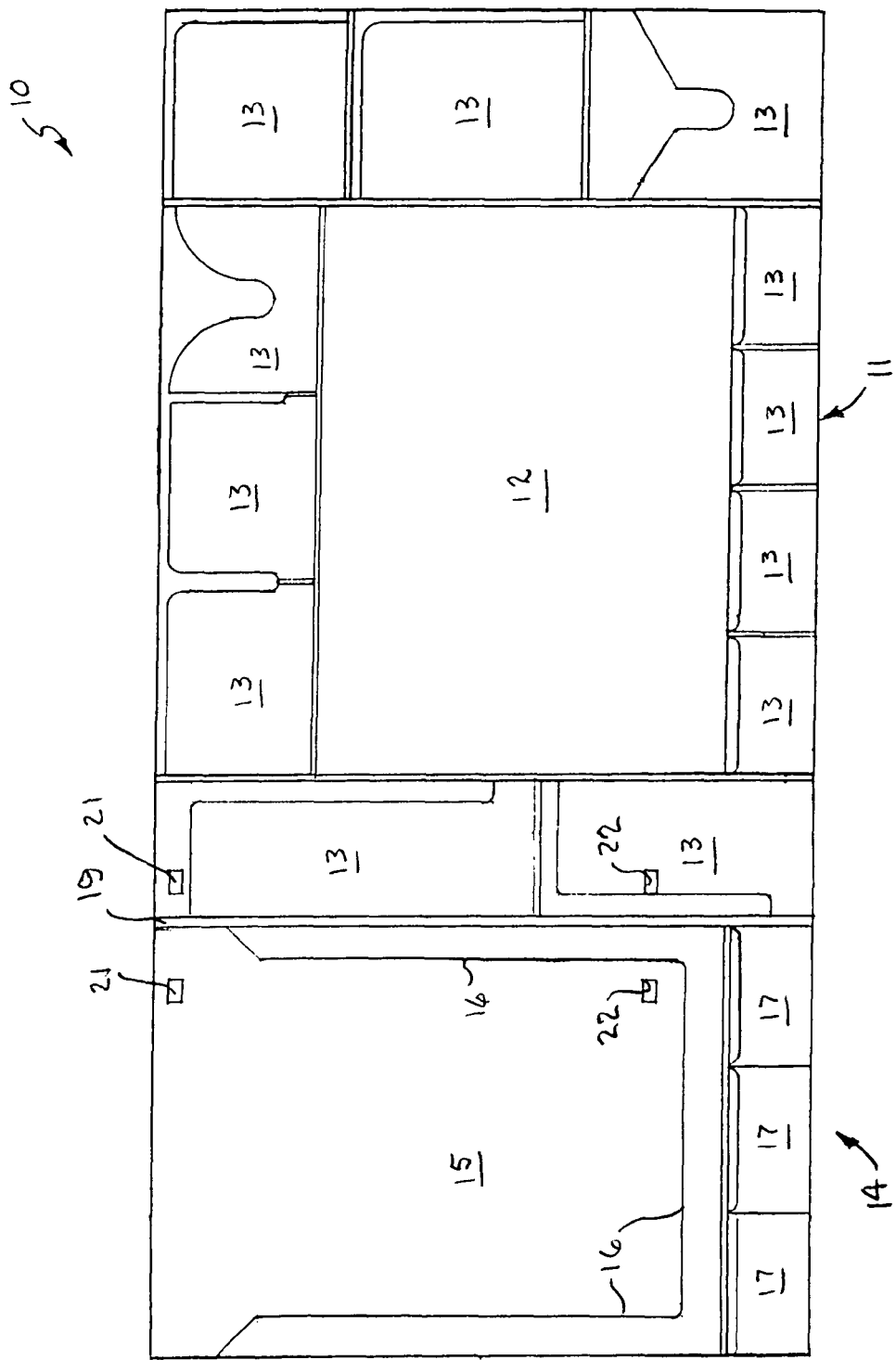
FIG. 1 is a front elevation view of the organizer for computer monitors, in accordance with the present invention.
Figure 2:
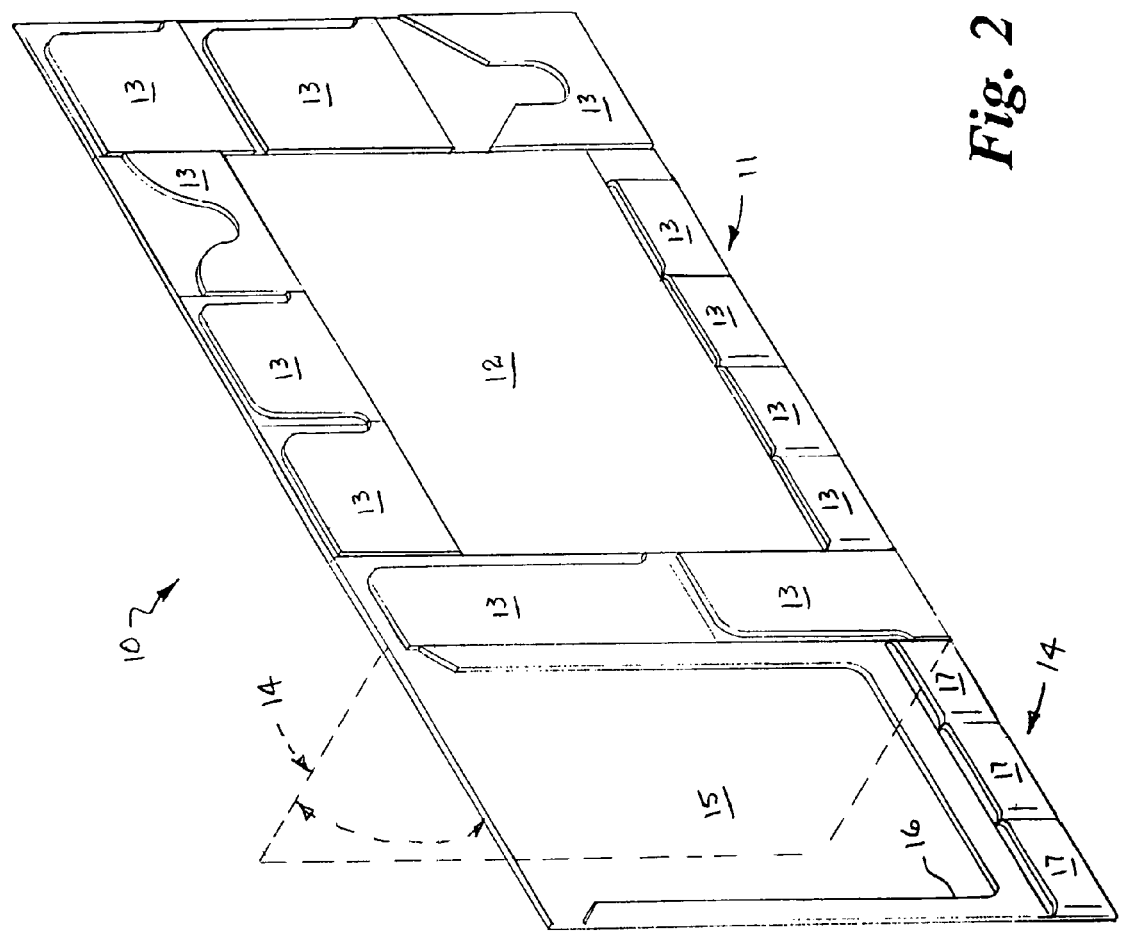
FIG. 2 is a perspective view of the organizer for computer monitors.

Referring now to the drawings by numerals of reference, there is shown in FIGS. 1 and 2, a preferred embodiment of an organizer 10 for a computer monitor or other display monitor. A typical computer monitor has a display screen such as a cathode ray tube (CRT) or a liquid crystal display (LCD) with a rectangular front or "viewed" surface to be viewed by a user of the computer, which is generally planar and of a predetermined width and height, and is surrounded by the monitor housing having a front surface around and generally parallel with the viewed surface of the display tube.

The organizer 10 is formed of thin, transparent material having a large generally rectangular transparent shield panel 11 of a width and height generally corresponding to, or slightly greater than, the width and height of the front viewed surface of the display tube or screen in the computer monitor. The shield panel 11 has a rectangular central portion 12 surrounded on four sides by a series of generally rectangular pockets 13 extending along the top, bottom, and lateral sides of the outer surface thereof.

A transparent storage flap or lateral side panel 14 is hingedly adjoined to the shield panel 11 and adapted to pivot relative thereto and to a side of the computer monitor, as shown in dashed line in FIG. 2. The lateral side panel 14 has a rectangular central portion 15 surrounded on three sides by narrow strips of material on the outer surface thereof having an open top end and open sides facing the central portion in a generally U-shaped configuration to define a relatively large pocket 16 for holding larger flat items, such as papers, a photo, a planner, or calendar, etc. A series of adjacent small pockets 17 extend along the bottom of the outer surface of the side panel 14 beneath the larger pocket 16.

Referring now to FIG. 3, the organizer 10 is formed of two plies of thin, transparent flexible plastic material 10A and 10B. The shield panel 11 portion is formed by enclosing between the plies 10A and 10B, a thin rectangular filter sheet 18 made of any one of the conventional monitor filter materials, which can include one or more of materials for restricting glare, for improving contrast, for reducing static electricity, and/or for blocking certain types of radiation along the viewed surface of the display tube or screen. Preferably, the thin plies 10A and 10B are sealed together around the outer periphery of the filter sheet 18 by conventional sealing methods well known in the art. Optionally, the plies 10A and 10B may be left unsealed at the top end such that the filter sheet 18 may be removably installed between the plies.

Similarly, the storage flap or lateral side panel portion 14 is formed by enclosing a thin rectangular stiffener sheet of relatively stiff transparent material between the thin plastic plies 10A and 10B, and sealing them together around the stiffener sheet. The adjacent vertical sides of the stiffener sheet and the filter sheet are spaced a short distance apart whereby the space between them that is occupied by the sealed plies forms a hinged connection 19 between them (FIG. 1).

As shown in FIG. 3, mounting means, such as suction cups 20 are secured to the outer ply 10B on the back side of the shield panel 11, closely adjacent to its four corners for adhering the organizer 10 to either the display tube or screen or to the monitor housing surrounding the display tube or screen. Alternatively, other fastener means such as hook and loop fasteners (Velcro) may be used to releasably secure the shield panel 11 to the monitor housing.

The pockets 13 and 17 secured on the outer ply 10A of the shield panel 11 and the lateral side panel 14 are of various shapes and sizes to hold different articles and objects so they are immediately available and/or viewable during the course of operating the computer. The pockets are preferably transparent, but may be opaque or a combination thereof. The pockets are sized and shaped to hold articles and objects, such as compact disks (CD's), diskettes, business cards, to-do lists, notes, messages, templates, calendars, photographs, etc.

As described above, and shown in FIG. 2, the storage flap or lateral side panel 14 is hingedly adjoined to the shield panel 11 and adapted to pivot relative thereto and to a side of the computer monitor. As shown in FIG. 1, in a preferred embodiment, an upper pair and a lower pair of generally rectangular apertures 21 and 22 are punched through the shield panel 11 and the lateral side panel 14 in laterally spaced relation near their upper and lower ends.

A pair of angular adjustment members 23, one of which is shown in FIG. 4, may be provided to releasably maintaining the lateral side panel 14 at selected angles relative to the shield panel 11. Each angular adjustment member 23 is a thin stiff rectangular member having at least one generally V-shaped notch 24 at one end and a series of adjacent generally V-shaped notches 25 at its opposed end. To install the adjustment members 23, the lateral side panel 14 is held at a preferred angle relative to the shield panel 11 and each adjustment member is sequentially installed through the upper and lower pairs of apertures 21 and 22, respectively, and is rotated about its longitudinal axis to engage the notches 24 and 25 in the apertures and thereby latch or maintain the lateral side panel at the desired angle relative to the shield panel. Alternatively, hook and loop fasteners (Velcro) may be used to releasably maintain the lateral side panel 14 at selected angles relative to the shield panel 11.

Alternatively, the organizer 10 may be provided without the filter sheet 18, wherein the shield panel 11 has a rectangular central opening 12 surrounded on four sides by the series of generally rectangular pockets 13 extending along the outer top, bottom, and lateral sides thereof. In this modification, the shield panel 11 portion is formed by enclosing between the plies 10A and 10B, a thin rectangular stiffener sheet having a central rectangular opening approximately the same size as the viewed surface of the display tube and sealing the plies together around the outer periphery and inner periphery of the stiffener sheet.

While this invention has been described fully and completely with special emphasis upon preferred embodiments, it should be understood that within the scope of the appended claims the invention may be practiced otherwise than as specifically described herein.

The invention claimed is:

1. An organizer for a computer monitor having a viewing screen, said organizer comprising:
    an organizer formed of two plies of thin, flexible transparent plastic material with a thin rectangular filter sheet enclosed therebetween defining a transparent shield panel adapted to cover the viewing screen of the monitor, and at least one thin generally rectangular stiffener sheet enclosed between said two plies in laterally spaced adjacent relation to said filter sheet defining at least one transparent lateral side panel hingedly adjoined to said shield panel adapted to pivot relative thereto and to a side of the computer monitor;
    releasable fastener means on a rear surface of said shield panel for releasably attaching said shield panel to the monitor;
    a plurality of pockets on a front surface of said shield panel and said lateral side panel adapted to receive and hold documents, items and materials and maintain them in a convenient location for easy access or viewing while working on the computer; and
    angular adjustment means for releasably maintaining said lateral side panel at a selected angle relative to said shield panel.

2. The organizer according to claim 1, wherein
said two plies are sealed together around an outer periphery of said filter sheet and said stiffener sheet; and
said stiffener sheet and said filter sheet are spaced a sufficient distance apart such that the space therebetween occupied by said sealed plies forms a hinged connection therebetween.

3. The organizer according to claim 1, wherein
said two plies are sealed together around an outer periphery of said stiffener sheet; and
said two plies are sealed together around three sides of said filter sheet defining an open side through which said filter sheet is removably installed; and
said stiffener sheet and said filter sheet are spaced a sufficient distance apart such that the space therebetween occupied by the sealed plies forms a hinged connection therebetween.

4. The organizer according to claim 1, wherein
said two plies of thin, flexible transparent plastic material are formed of a static electricity dissipating material adapted to reduce dust build-up; and
said filter sheet is formed of a filtering material selected from the group consisting of a glare reducing material, a contrast improving material, and a radiation blocking material for blocking harmful radiation.

5. The organizer according to claim 1, wherein
said releasable fastener means is selected from the group consisting of suction cups and hook and loop fasteners.

6. The organizer according to claim 1, wherein
adjacent sides of said shield panel and said lateral side panel each have at least one aperture extending therethrough near upper and lower ends thereof; and
said angular adjustment means comprises at least one stiff member having opposed ends removably received in respective said apertures in adjacent sides of said shield panel and said lateral side panel near either of said upper or lower ends thereof to releasably maintain said lateral side panel at a selected angle relative to said shield panel.

7. The organizer according to claim 6, wherein
said stiff member is a generally rectangular member having at least one generally V-shaped notch at one end and a series of adjacent generally V-shaped notches at an opposed end releasably engaged in respective said apertures in adjacent sides of said shield panel and said lateral side panel near either of said upper or lower ends thereof to releasably maintain said lateral side panel at a selected angle relative to said shield panel.

8. The organizer according to claim 1, wherein
said transparent shield panel has a width and height generally the same as, or slightly greater than, the width and height of a front viewed surface of the viewing screen of the monitor.

9. The organizer according to claim 1, wherein
said shield panel has a generally rectangular central portion; and
each of said plurality of pockets are generally rectangular pockets having an open end.

10. The organizer according to claim 9, wherein
a number of said plurality of pockets are disposed along top, bottom, and lateral sides of an outer surface of said shield panel generally rectangular central portion.

11. The organizer according to claim 1, wherein
said at least one lateral side panel has a generally rectangular central portion; and
each of said plurality of pockets are generally rectangular pockets having an open end.

12. The organizer according to claim 11, wherein
a number of said plurality of pockets are disposed along three sides of an outer surface of said lateral side panel generally rectangular central portion.

13. The organizer according to claim 11, wherein
at least one of said pockets on an outer surface of said lateral side panel is a larger generally rectangular pocket for holding larger flat items.

14. The organizer according to claim 13, wherein
a number of said plurality of pockets on an outer surface of said lateral side panel comprise a series of adjacent smaller pockets extending along a bottom portion of said outer surface of the side panel beneath said larger pocket.

\* \* \* \* \*